United States Patent
Gandhi et al.

(10) Patent No.: US 9,942,097 B2
(45) Date of Patent: Apr. 10, 2018

(54) POWER MANAGEMENT IN A NETWORK OF INTERCONNECTED SWITCHES

(71) Applicant: BROCADE COMMUNICATIONS SYSTEMS, INC., San Jose, CA (US)

(72) Inventors: Ram Kumar Gandhi, Bangalore (IN); Shivalingayya Chikkamath, Bangalore (IN); Mythilikanth Raman, San Jose, CA (US)

(73) Assignee: BROCADE COMMUNICATIONS SYSTEMS LLC, San Jose, CA (US)

( * ) Notice: Subject to any disclaimer, the term of this patent is extended or adjusted under 35 U.S.C. 154(b) by 182 days.

(21) Appl. No.: 14/792,166

(22) Filed: Jul. 6, 2015

(65) Prior Publication Data
US 2016/0197784 A1 Jul. 7, 2016

Related U.S. Application Data

(60) Provisional application No. 62/099,974, filed on Jan. 5, 2015.

(51) Int. Cl.
*H04L 12/24* (2006.01)
*H04L 12/12* (2006.01)
(Continued)

(52) U.S. Cl.
CPC .......... *H04L 41/0833* (2013.01); *H04L 12/12* (2013.01); *H04L 45/245* (2013.01);
(Continued)

(58) Field of Classification Search
None
See application file for complete search history.

(56) References Cited

U.S. PATENT DOCUMENTS

| 829,529 A | 8/1906 | Keathley |
|---|---|---|
| 2,854,352 A | 9/1958 | Gronemeyer |

(Continued)

FOREIGN PATENT DOCUMENTS

| CN | 1735062 | 2/2006 |
|---|---|---|
| CN | 1777149 | 5/2006 |

(Continued)

OTHER PUBLICATIONS

"Network based IP VPN Architecture using Virtual Routers" Paul Knight et al.
(Continued)

*Primary Examiner* — Jeffrey M Rutkowski
*Assistant Examiner* — Mandish Randhawa
(74) *Attorney, Agent, or Firm* — Shun Yao; Park, Vaughan, Fleming & Dowler LLP

(57) ABSTRACT

A switch can reduce power consumption in a switch network by disabling under-utilized links between switches. The switch can include one or more line cards each operable to transmit and receive packets over a respective link to a remote switch. The switch can also comprise a control mechanism operable to place under-utilized links in standby mode whenever possible to conserve power. During operation, the switch can receive a standby request for placing a first link to a neighboring switch in a standby mode, and determines whether one or more eligible links to the neighboring switch can accommodate traffic from the first link. If the eligible links are able to accommodate traffic from the first link, and if the local switch and the neighboring switch agree to place the first link in standby mode, the local switch proceeds to place the first link in standby mode.

20 Claims, 6 Drawing Sheets

(51) Int. Cl.
*H04L 12/709* (2013.01)
*H04L 12/26* (2006.01)

(52) U.S. Cl.
CPC .......... *H04L 43/0894* (2013.01); *H04L 43/16* (2013.01); *Y02B 60/34* (2013.01)

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 * | 7/2008 | Betker .................. H04L 49/357 370/254 |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | Ha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |

(56) References Cited

U.S. PATENT DOCUMENTS

| | | |
|---|---|---|
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,524,173 B2 | 12/2016 | Guntaka |
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1* | 3/2002 | Ben-Ami .......... H04Q 11/0421 370/254 |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |

(56) References Cited

U.S. PATENT DOCUMENTS

| | | |
|---|---|---|
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1* | 12/2008 | Koenen ............... H04L 12/10 370/477 |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | Halna DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |

(56) References Cited

U.S. PATENT DOCUMENTS

| | | |
|---|---|---|
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0194914 A1 | 8/2013 | Agarwal |
| 2013/0201992 A1 | 8/2013 | Masaki |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |

(56) References Cited

U.S. PATENT DOCUMENTS

| | | |
|---|---|---|
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0192804 A1 | 7/2014 | Ghanwani |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Moopath |
| 2014/0362854 A1 | 12/2014 | Addanki |
| 2014/0362859 A1 | 12/2014 | Addanki |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0110111 A1 | 4/2015 | Song |
| 2015/0110487 A1 | 4/2015 | Fenkes |
| 2015/0117256 A1 | 4/2015 | Sabaa |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0344640 A1 | 11/2016 | Soderlund et al. |
| 2017/0026197 A1 | 1/2017 | Venkatesh |
| 2017/0097841 A1 | 4/2017 | Chang |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017,
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.

(56) References Cited

OTHER PUBLICATIONS

Office Action for U.S. Appl. No. 14/662,092, dated Mar. 29, 2017.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
'Switched Virtual Networks. Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Oct. 4, 2000].
Office Action dated Jun. 18, 215, U.S. Appl. No. 13/098,490, filed May 2, 2011.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office Action dated Jun. 16, 2015, U.S. Appl. No. 13/048,817, filed Mar. 15, 2011.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004) pp. 124-131, XP001198207, ISSN: 0163-6804, DOI: MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', BROCADE white paper, http://community.brocade.com/docs/DOC-2954, Dec. 3, 2012.
Brocade, 'Brocade Fabrics OS (FOS) 6.2 Virtual Fabrics Feature Frequently Asked Questions', pp. 1-6, 2009 Brocade Communications Systems, Inc.
BROCADE, 'FastIron and TurboIron 24x Configuration Guide', Feb. 16, 2010.
BROCADE, 'The Effortless Network: Hyperedge Technology for the Campus LAN' 2012.
BROCADE 'Brocade Unveils 'The Effortless Network'', http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.

Narten, T. et al., 'Problem Statement: Overlays for Network Virtualization d raft-narten-n vo3-over l ay-problem-statement-01', Oct. 31, 2011.
Office Action for U.S. Appl. No. 13/092,752, filed Apr. 22, 2011, dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, dated Jul. 23, 2013.
Office Action for U.S. Appl. No. 13/742,207 dated Jul. 24, 2014, filed Jan. 15, 2013,
Office Action for U.S. Appl. No. 12/725,249, filed Mar. 16, 2010, dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.

(56) References Cited

OTHER PUBLICATIONS

Office Action for U.S. Appl. No. 13/365,808, filed Jul. 18, 2013, dated Jul. 18, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network- smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.

(56) References Cited

OTHER PUBLICATIONS

Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/365,993, filed Feb. 3, 2012, from Cho, Hong Sol., dated Jul. 23, 2013.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, Ed K. et al., 'Virtual Private Lan Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/425,238, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated Apr. 1, 2015 U.S. Appl. No. 13/656,438 filed Oct. 19, 2012.
Office Action dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.

* cited by examiner

POWER MANAGEMENT IN A NETWORK OF INTERCONNECTED SWITCHES

RELATED APPLICATIONS

This application claims the benefit of U.S. Provisional Application No. 62/099,974, entitled "Power Saving Feature for ISLs in a Fabric," by inventors Ram Kumar Gandhi, Shivalingayya Chikkamath, and Mythilikanth Raman, filed 5 Jan. 2015, the disclosures of which are incorporated by reference herein.

The present disclosure is related to U.S. patent application Ser. No. 13/087,239, entitled "Virtual Cluster Switching," by inventors Suresh Vobbilisetty and Dilip Chatwani, filed 14 Apr. 2011, the disclosure of which is incorporated by reference herein.

BACKGROUND

Field

The present disclosure relates to network design. More specifically, the present disclosure relates to a method for a constructing a scalable switching system that facilitates automatically minimizing power consumption across the network switches.

Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

One way to increase the throughput of a switch system is to use switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking from being a practical option in building a large-scale switching system. Furthermore, a system based on stacked switches often has topology limitations which restrict the scalability of the system due to fabric bandwidth considerations.

Some switching technologies can manage individual links to optimize power usage. However, these technologies cannot be used in a switch system, because shutting down a link when traffic gets low may break the topology of the switch system.

SUMMARY

One embodiment provides a switch that facilitates reducing power consumption in a switch network by disabling under-utilized links between switches when other links can accommodate the leftover traffic. The switch can include one or more line cards each configured to transmit and receive packets over a respective link to a remote switch. The switch also includes a control mechanism operable to place under-utilized links in standby mode whenever possible to conserve power. During operation, the switch can receive a first standby request for placing a first link to a neighboring switch in a standby mode, and determines whether one or more eligible links to the neighboring switch can accommodate traffic from the first link. If the one or more eligible links are able to accommodate traffic from the first link, and if the local switch and the neighboring switch agree to place the first link in standby mode, the local switch proceeds to place the first link in standby mode.

In some embodiments, the one or more eligible links include links to the neighboring switch that do not have a pending standby request.

In some embodiments, the control mechanism can reject the first standby request in response to determining that the one or more eligible links cannot accommodate traffic from the first link.

In some embodiments, if the first standby request originated from a local line card, and the control mechanism can place the first link in standby mode by sending, to the neighboring switch, a second standby request for placing the first link in standby mode. The control mechanism rejects the first standby request in response to determining that the neighboring switch has not acknowledge the second standby request within a predetermined timeout period.

In some embodiments, if the first standby request originated from a local line card, the control mechanism can place the first link in standby mode by determining that there exist other pending standby requests at the local routing bridge, and determining whether the one or more eligible links to the neighboring switch can accommodate traffic from the first standby request and all other pending standby requests. The control mechanism can reject the first standby request in response to determining that the eligible links cannot accommodate traffic from the first standby request and all other pending standby requests.

In some embodiments, if the standby request originated from the neighboring switch, the control mechanism determines whether there exist any pending standby requests from a local line card. If a pending standby request from a local line card exists, the control mechanism defers processing of the standby request from the neighboring switch until there are no pending standby requests from any local line cards.

In some embodiments, the control mechanism determines whether a priority is sufficiently high among the eligible links that are to accommodate traffic for the first link. If the priority among the eligible links is not sufficiently high, the control mechanism rejects the first standby request.

In some embodiments, the control mechanism determines whether the first link is a member of a trunk. If the first link belongs to a trunk, the control mechanism updates trunk state information to remove the first link from the trunk.

In some embodiments, the control mechanism can receive a link activate request from a line card. In response, the control mechanism selects, from a set of eligible links in standby mode, a link with a lowest priority that satisfies a priority requirement from the line card, and activates the selected link.

BRIEF DESCRIPTION OF THE FIGURES

In the figures, like reference numerals refer to the same figure elements.

DETAILED DESCRIPTION

Figure 1:
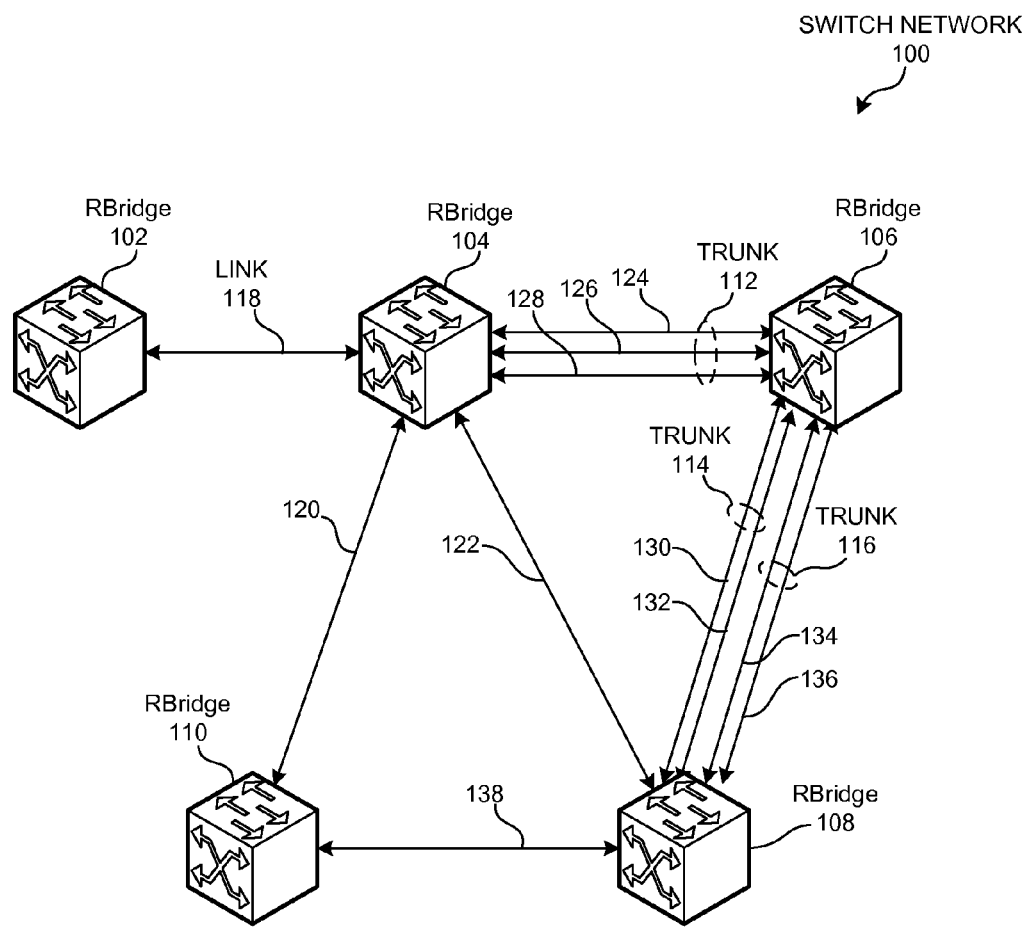
FIG. 1 illustrates an exemplary switch network 100 in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a network of interconnected switches that solve the problem of reducing power consumption in the switch network by disabling under-utilized links between switches when other links can accommodate the leftover traffic. The switch network comprises a distributed set of switches, which are interconnected by Inter Switch Links (ISLs). The ISL links can be logical links, and carry the traffic between the switches of the switch network. The switches can perform distributed and dynamic provisioning of ISLs to conserve power across the individual switches.

For example, if an ISL link is not utilized or underutilized, the switch clusters at opposing ends of the ISL link can put the link in a standby mode, which reduces the power consumption of the line cards that drive the ISL link. During operation, the distributed switches can bring up or tear down the ISL link of the switch network as necessary to operate the active ISL links in as close to their maximum bandwidth as possible. This minimizes the number of ISL links operating at less than half their possible bandwidth, which consume more power than having less ISL links operating at near their maximum bandwidth.

The individual switch clusters or switches in the switch network can be an Ethernet switch, a routing bridge (RBridge), or a switch cluster. If multiple ISLs exist between two neighboring switches, these ISLs can automatically be combined to form a logical ISL trunk. Also, there can be multiple trunks between two switches, and each trunk can have multiple ISL links that carry traffic between the switches. During operation, the distributed switches can also bring up or tear down the ISL links of the switch network as necessary to add necessary bandwidth to a trunk, or to release underutilized bandwidth from the trunk. Hence, the switch network allows neighboring switches to reconfigure their trunks on-the-fly to ensure these trunks make optimal use the available ISL links, while minimizing the power consumption of the line cards that drive these ISL links.

It should be noted that a virtual cluster switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a switch network, or a network of interconnected switches (which can be referred to as a switch fabric, a virtual cluster switching (VCS) fabric, or simply as "VCS") can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the switch fabric, an individual physical switch can dynamically join or leave the switch fabric without disrupting services to the rest of the network.

Furthermore, the automatic and dynamic configurability of switch fabric allows a network operator to build its switching system in a distributed and "pay-as-you-grow" fashion without sacrificing scalability. The switch fabric's ability to respond to changing network conditions makes it an ideal solution in a virtual computing environment, where network loads often change with time.

FIG. 1 illustrates an exemplary switch network 100 in accordance with an embodiment. Switch network 100 may include an Internet Protocol (IP) network, a Multiprotocol Label Switching (MPLS) network, a Transparent Interconnection of Lots of Links (TRILL) network, a Fibre Channel (FC) network, or may include any network technology now known or later developed. Specifically, switch network 100 can include a plurality of switch clusters, which are interconnected via Inter Switch Link (ISL) logical links. These ISL logical links are hereinafter referred to as ISL links, or simply as "links."

In some embodiments, the ISL links can carry bidirectional traffic. Each switch can include multiple line cards, each of which includes a transmission (tx) circuit and a receiving (rx) circuit for sending and receiving data over a network link. A switch can use multiple line cards to establish and maintain multiple ISL links for interfacing with one or more other switches. For example, switch network 100 can include a switch 104 interconnected with a switch 104 via an ISL link 118, interconnected with a switch 108 via an ISL link 122, and interconnected with a switch 110 via an ISL link 120.

In some embodiments, multiple ISL links can be combined to form a high-bandwidth ISL trunk. The individual switches can add ISL links to a trunk when the trunk needs additional bandwidth, and can remove ISL links from the trunk when the trunk is underutilizing the ISL links in the trunk. For example, switch network 100 may include a switch 106 that can be interconnected with switch 104 via a trunk 112, made up of ISL links 124, 126, and 128. Moreover, switch 106 can be interconnected with switch 108 via two trunks: a trunk 114 comprising ISL links 130 and 132; and a trunk 116 comprising ISL links 134 and 136.

In some embodiments, each switch (or each switch of a switching cluster) can include software running on the switch, which manages a local state of each ISL link to which the switch is connected. When a line card of a switch detects that low traffic is running on an ISL link, the line card generates a standby request notification requesting to transition the ISL link into standby mode. The switch's software can receive standby request messages from the local line cards, and decides which ISL links are to enter standby mode and which ISL links are to remain operational. For example, the switch can calculate the total bandwidth crossing an ISL trunk made up of a plurality of ISL links. If the switch determines that the traffic can be accommodated into fewer ISL links than are currently active in the trunk, the switch selects one or more links to place in standby mode.

In some embodiments, each ISL link can have an associated low bandwidth threshold, and an associated high bandwidth threshold. During operation, if a line card monitoring traffic on an ISL link detects that the traffic drops below the low bandwidth threshold, the line card generates a standby request notification for the ISL link. On the other hand, if the line card detects that the ISL link's traffic is rising above the high bandwidth threshold, the line card generates an activate request message for the switch.

A user or administrator of a switch can preconfigure the low bandwidth and high bandwidth thresholds for the ISL links, as well as the Quality of Service (QoS) policies for the individual ISL links and ISL trunks. For example, if the user is concerned about the HTTP traffic in the switch network, the user can configure a policy that is specific to the HTTP traffic. Instead of setting the high and low bandwidth threshold values for all traffic across an ISL link, the user can set certain high and/or low bandwidth threshold values for the HTTP traffic. The user can also create other policies to set other bandwidth threshold values for other types of traffic.

In some embodiments, the individual switches can each implement a trunk state machine (TKSM) for each ISL trunk to which the switch is connected. This TKSM can include a current state for the links that make up ISL trunk 112, such as the set of member ISL links, and their recent bandwidth. For example, switches 104 and 106 can updates their local TKSM for ISL trunk 112 in response to adding a link to ISL trunk 112, or in response to removing a link from ISL trunk 112. If switches 104 and 106 agree to place ISL link 124 in standby mode due to low traffic across trunk 112, switches 104 and 106 will each update their local TKSM for trunk 112 to remove ISL link 124 from trunk 112.

Also, if switch 104 (or switch 106) re-activates ISL link 124 to increase the bandwidth across trunk 112, link 124 will first exist as an individual ISL link outside of ISL trunk 112. Once ISL link 124 is active, switches 104 and 106 can update their local TKSM for ISL trunk 112 to add ISL link 124 into ISL trunk 112. From this point forward, the entire traffic between switches 104 and 106 can be carried across the three ISL links of ISL trunk 112 (e.g., links 124, 126, and 128), based on the TKSM.

In some embodiments, a switch can store and manage multiple TKSMs. For example, switches 106 and 108 can transfer traffic to each other over two separate ISL trunks 114 and 116. Switches 106 and 108 may keep ISL trunks 114 and 116 separate when they each trunk requires different network parameters, or when each trunk has been provisioned for different customers. Switches 106 and 108 can each store a TKSM for ISL trunk 114, and a separate TKSM for ISL trunk 116.

In exemplary switch network 100, the TKSM for ISL trunk 114 can be initially configured to include link status information for ISL links 130 and 132, and the TKSM for ISL trunk 116 can be initially configured to include link status information for ISL links 134 and 136. However, if switches 106 and 108 agree to place ISL link 132 in standby mode due to low traffic across at least one direction, ISL trunk 114 is left with only ISL link 130. At this point, both switches 106 and 108 may destroy the TKSM for ISL trunk 114, leaving ISL link 130 as a standalone link.

Moreover, it is possible for switches 106 and 108 to combine two or more ISL trunks into one ISL trunk if they have compatible link parameters. For example, switch 108 may analyze a set of parameters associated with ISL link 130 and the TKSM for ISL trunk 116 to determine whether they are compatible. If the link parameters for ISL link 130 do not contradict the link parameters for ISL trunk 116, switches 106 and 108 can add ISL link 130 to ISL trunk 116, and also update their TKSM for ISL trunk 116 to include ISL link 130 as a member link. However, if the link parameters for ISL link 130 are not compatible with those of ISL trunk 116, switches 106 and 108 will leave ISL link 130 as a standalone link.

In some embodiments, when ISL link 132 is placed in standby mode, it becomes available to expand the bandwidth capacity for ISL trunk 116 or ISL link 130 in the future. For example, if transmission traffic from switch 108 increases above a maximum bandwidth threshold for ISL link 134 or 136, switch 108 can activate ISL link 132. However, in order to offload traffic from ISL trunk 116 onto ISL link 132, switch 108 needs to change the configuration parameters for ISL link 132 to match those of ISL trunk 116, and can add ISL link 132 to ISL trunk 116 by updating the TKSM to include ISL link 132 as a member link of ISL trunk 116. At this point, switch 108 can transmit traffic for ISL trunk 116 via ISL link 132 in addition to ISL links 134 and 136.

Placing Links in Standby Mode

In some embodiments, each line card can include an HSL software module running in the line card. The HSL module can include a kernel module, running at the hardware subsystem layer to monitor the network traffic for the corresponding line card's physical link. More specifically, the HSL modules of the switch network can run as a synchronized distributed system across each of the line cards in the switch network. Each HSL module instance maintains the global topology information all ISL links and ISL trunks of the switch network, and synchronizes changes to the switch network topology information with other HSL module instances of other switches via the active ISL links and trunks. This ensures that the individual HSL module instances of the switch network have a common view of the switch network's topology, which makes it possible for them to use their local network topology information when deciding which ISL links to place in standby mode or to activate.

For example, switches 102 and 104 are interconnected by a single ISL link 118. If the traffic across ISL link 118 drops to below the low bandwidth threshold, the HSL modules for ISL link 118 at switches 102 and 104 would generate a standby request notification for switches 102 and 104, respectively. However, bringing down ISL link 118 would disconnect a portion of the switch network (namely, the link between switches 102 and 104) because there are no other links that can carry the traffic that would no longer be carried by ISL link 118. Because of this, switches 102 and 104 will not honor the standby request for ISL link 118.

As another example, assume that the traffic for ISL link 124 drops below a minimum threshold. In response to detecting this low traffic, the HSL module for ISL link 124 at switch 104 can issue a standby request. If ISL links 126 and 128 can accommodate the traffic from ISL link 124, switch 104 can send a standby request message to its neighboring switch across ISL link 124 (e.g., to switch 106). Switch 106 then either acknowledges that ISL link 124 can be placed in standby mode, or can deny the request to place ISL link 124 in standby mode. If switch 106 returns an acknowledgement message, then both switches 104 and 106 may proceed to place ISL link 124 into standby mode. Switch 104 then places ISL link 124 in standby mode by returning an acknowledge message to the local HSL module for ISL link 124, which in turn disables the transmit and receive radios for ISL link 124.

However, if ISL links 126 and 128 cannot accommodate the traffic, or if switch 106 does not acknowledge the standby request (e.g., by returning a negative acknowledgement (NACK) message to deny the standby request, or by not returning an ACK message within a timeout period), then switches 104 and 106 will keep ISL link 124 active.

In some embodiments, placing an ISL link in standby mode is a two-level process. Initially, a line card for the ISL link generates a standby request for the ISL link when the ISL link's bandwidth drops below a low bandwidth threshold. A software module running on the switch that carries the line card receives the standby request from the line card, and processes the line card's standby request to determine whether the local switch can place the ISL link on standby. The switch's software module stores global network topology information, the ISL trunk state machines, and the QoS priority information, and uses this information to determine whether to place the ISL link on standby.

Then, if the local switch can place the ISL link on standby, the software module proceeds to issue another standby request to the neighboring switch at the other side of the ISL link. The two switches place the ISL link on standby if they are in agreement to do so.

Figure 2:
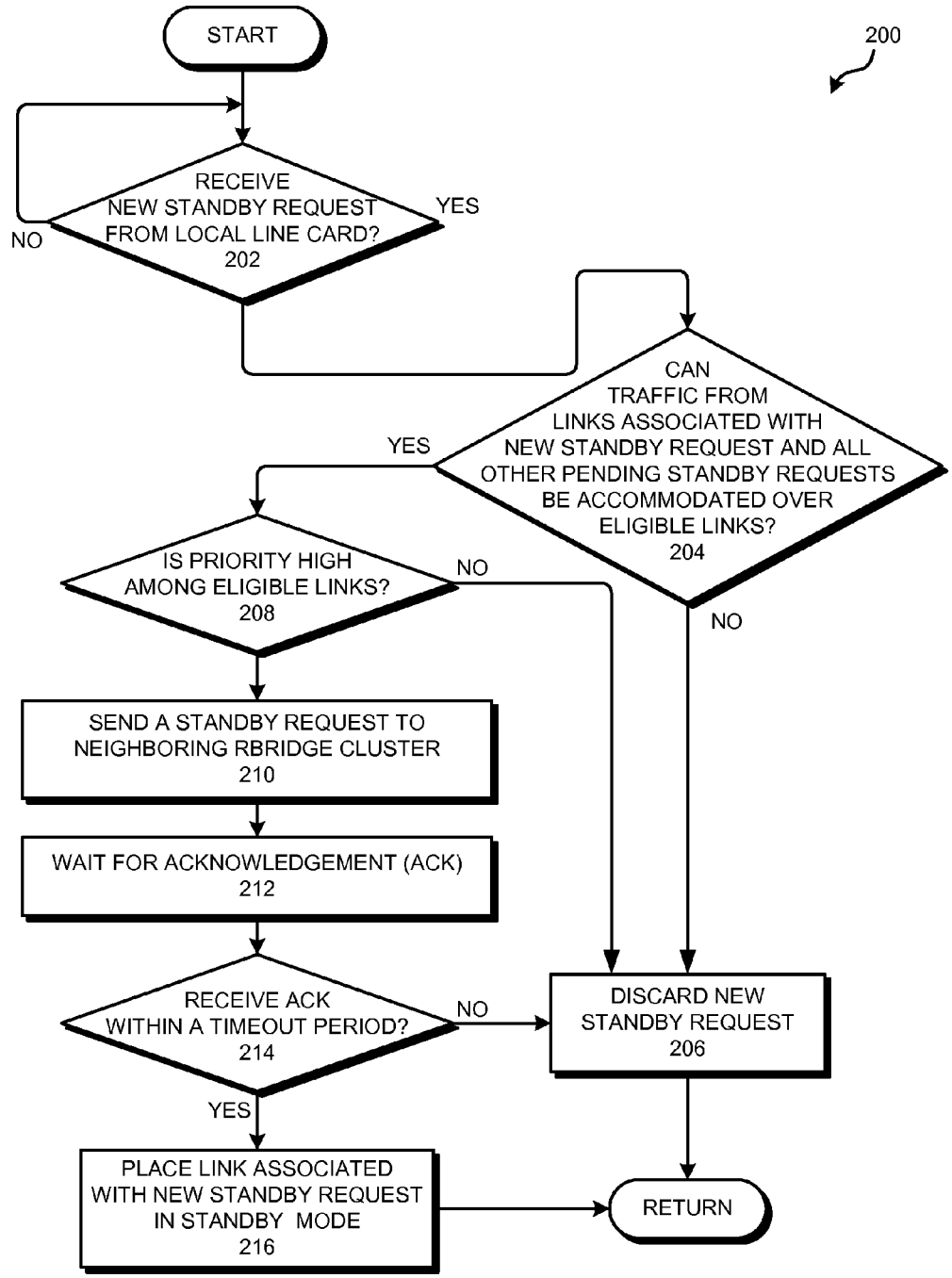
FIG. 2 presents a flow chart illustrating a method 200 for processing a standby request from a local line card in accordance with an embodiment.

FIG. 2 presents a flow chart illustrating a method 200 for processing a standby request from a local line card in accordance with an embodiment. During operation, the switch can determine whether a line card has issued a new standby request (operation 202). Note that it's possible that the switch may receive a standby request from a line card while the switch is awaiting a standby acknowledgement from a neighboring switch for another ISL link. However, it's likely that the traffic bandwidth that needs to be accommodated after placing both ISL links in standby mode may be more than what the remaining eligible ISL links can handle.

In some embodiments, if the switch has received a new standby request from a line card (operation 202), the switch determines whether the eligible links can accommodate traffic from links associated with the standby request and all other pending standby requests (operation 204). Hence, during operation 204, the switch determines an aggregate bandwidth for the requesting ISL link and the other pending standby requests, and determines whether one or more active ISL links or trunks have sufficient available bandwidth to accommodate this aggregate bandwidth without causing any of the ISL links or trunks to surpass a high bandwidth threshold.

If the remaining ISL links cannot accommodate the aggregate traffic, the switch will discard the new standby request from the line card (operation 206), and may preserve the other pending standby requests that have already been confirmed to be offloadable to other ISL links. For example, the new standby request may be for an ISL link that is meant to carry at least some of the traffic being offloaded by the other ISL links with pending standby requests. Hence, by discarding the recent standby request, the switch is ensuring that there is sufficient bandwidth available to for the ISL links associated with the other pending standby requests.

In some embodiments, if the local switch has received standby requests from another switch on a neighboring switch before or while processing the standby request from the local line card, the switch places the standby request from the neighboring switch on hold until the local switch has processed all standby requests from the local line cards.

On the other hand, if the remaining eligible links can accommodate the aggregate traffic for the switch (operation 204), the switch performs a Quality of Service (QoS) priority check among the eligible ISL links to determine whether the QoS priority is sufficiently high among the eligible links to satisfy the QoS priority requirements of the aggregate traffic (operation 208). If the QoS priority check does not succeed, the switch discards the standby request (operation 206).

Otherwise, the switch sends a standby request for placing the requesting ISL link in standby to a neighboring switch at the other end of the ISL link (operation 210), and waits for an acknowledgement (ACK) message from the neighboring switch for a predetermined timeout period (operation 212). If the switch receives the acknowledgement message within the timeout period (operation 214), the HSL module proceeds to place the ISL link associated with the new request in standby mode (operation 216). The switch may also inform local software modules that the ISL link is offline.

Otherwise, if the switch does not receive the in time or receives a negative acknowledgement message (NACK) rejecting the standby request, the switch proceeds to discard the new standby request (operation 206).

When the neighboring switch receives the standby request over the ISL link, the neighboring switch analyzes its outbound traffic across the ISL link to determine whether other ISL links can accommodate its outbound traffic. If so, the neighboring switch returns an acknowledgement message, which informs the local line card's HSL module that the ISL link can be placed in standby mode. At this point, both the local HSL module and an HSL module at the neighboring switch can proceed to place their transmit and receive circuits for the ISL link in standby mode. Also, if the ISL link is a member of an ISL trunk, both the local switch and the neighboring switch will update their trunk state machine (TKSM) to remove the ISL link from the trunk.

On the other hand, if the neighboring switch cannot accommodate the ISL link's traffic across other ISL eligible links or trunks (e.g., ISL links that are not pending to be placed in standby), the neighboring switch will reject the standby request. The neighboring switch may not return an acknowledgement message, or may return a NACK message to reject the standby request. For example, in some embodiments, it's possible that the local switch and the neighboring switch may issue two different standby requests to each other, such that there may not be enough eligible ISL links to support the additional bandwidth leftover after placing the two ISL links in standby.

For example, referring to switch network 100 of FIG. 1, switch 104 may issue a standby request to place ISL link 124 in standby mode when switch 104 can move its own outbound traffic for ISL link 124 over ISL links 126 and 128. At the same time, switch 106 may issue a standby request to place ISL link 126 in standby mode, prior to receiving the standby request for ISL link 124. At this point, switch 106 determines that eligible ISL links 124 and 128 can accommodate the traffic for ISL link 126, which are active at switch 106 and not currently pending a standby request at switch 106.

Then, after having sent the standby request for ISL link 126, switch 106 receives the standby request for ISL link 124 and determines whether ISL link 124 can be placed in standby mode in addition to disabling all other ISL links with a pending standby request (e.g., ISL link 126). If switch 106 determines that it cannot place ISL link 124 in standby mode in addition to placing ISL link 126 in standby, switch 130 will reject the standby request for ISL link 124.

Figure 3:
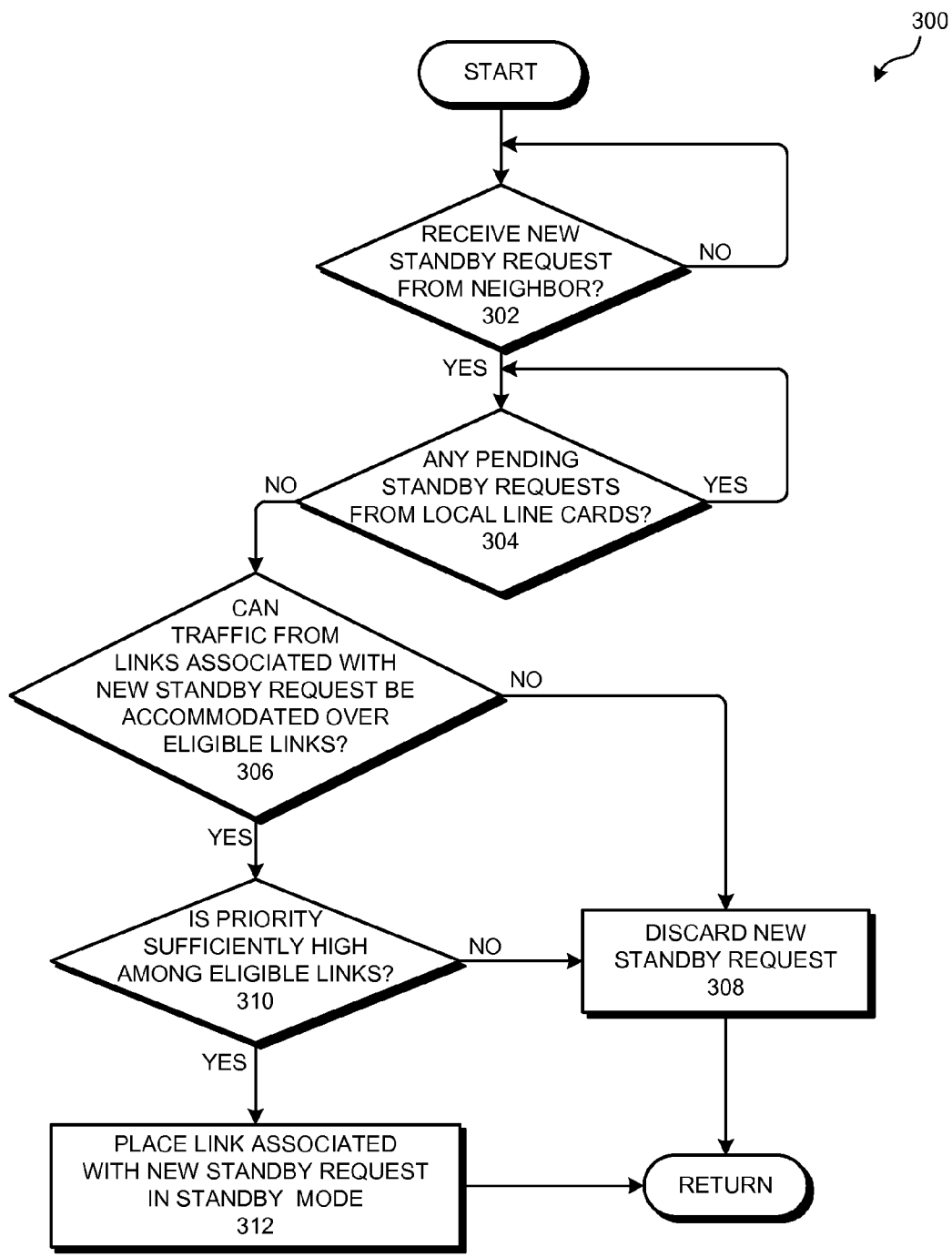
FIG. 3 presents a flow chart illustrating a method for processing a standby request from a neighboring cluster in accordance with an embodiment.

FIG. 3 presents a flow chart illustrating a method 300 for processing a standby request from a neighboring cluster in accordance with an embodiment. During operation, the HSL module can determine whether it has received a new standby request from a neighbor of the switch network (operation 302). If no standby requests arrive, the HSL module can return to operation 302 to wait for a standby request.

When the HSL module does receive a standby request from a neighbor, the HSL module determines whether there are any pending standby requests from any of the local line cards (operation 304). If there are requests pending from at least one local line card, the HSL module can return to operation 304 to wait for these local pending standby requests to be processed.

Once the HSL module determines that there are no local pending standby requests, the HSL module proceeds to determine whether the eligible ISL links can accommodate traffic from the links associated with the new standby request (operation 306). If the eligible links cannot accommodate the traffic, the HSL module discards the new standby request (operation 308).

However, if the traffic can be accommodated over the eligible ISL links, the HSL module determines whether the QoS priority level of the eligible ISL links is sufficiently high to satisfy the QoS priority requirements of the ISL links associated with the pending standby requests (operation 310). If the QoS priority level is not sufficiently high, the HSL module discards the new standby request (operation 308). Otherwise, the HSL module may proceed to place the ISL link associated with the new standby request in standby mode (operation 312).

Figure 4:
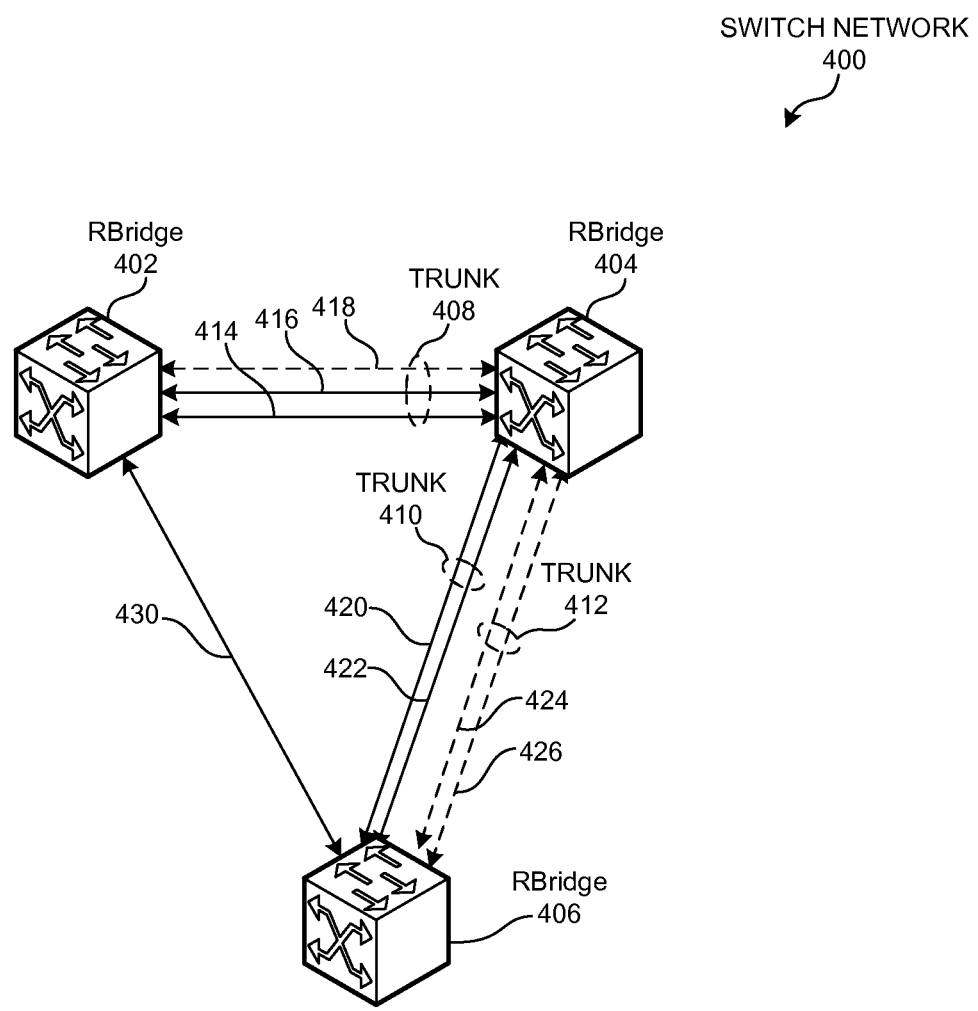
FIG. 4 illustrates an exemplary switch network after placing links in standby mode in accordance with an embodiment.

FIG. 4 illustrates an exemplary switch network 400 after placing links 410 and 418 in standby mode in accordance with an embodiment. Recall that a line card for each ISL link can have a transmission (tx) circuit and a receiving (rx) circuit, and two line cards at opposing ends of an ISL link may place the ISL link in standby mode when the transmission rate drops below the minimum threshold for both directions. If switch 402 sends to switch 404 a standby request to deactivate ISL link 418, switch 404 may reject the standby request message from switch 402 when switch 404 itself needs to transmit packets over ISL link 418.

As a further example, switch 404 may reject a standby request from switch 402 when switches 402 and 404 each issues a standby request for a different ISL link of ISL trunk 408, and there would not be sufficient bandwidth after disabling the two different ISL links. If switch 404 issues a standby request for ISL link 404 and receives a standby request for ISL link 418, Switch 404 may reject the incoming standby request for ISL link 418 if the bidirectional bandwidth across ISL trunk 408 is too large for ISL link 416 alone. However, if switch 404 issues a standby request for ISL link 418 and also receives a standby request for ISL link 418 from switch 402, switch 404 may return an acknowledgement message to disable ISL link 418 since both switches 402 and 404 are in agreement.

Once both ISL links 402 and 404 agree to deactivate ISL link 418, the corresponding line cards at switches 402 and 404 will turn off their tx and rx circuits to preserve power. Also, switches 402 and 404 will update the TKSM for trunk 408 to remove ISL link 418 from trunk 408.

In some embodiments, a switch can place multiple ISL links in standby mode at once. For example, the network traffic across ISL trunk 408 may drop to a low enough bandwidth to place two out of three ISL links in standby mode. Switch 402 may analyze priority values associated with the individual ISL links of trunk 408 to decide which ISL links to place in standby mode. Switch 402 may disable the ISL links with the lowest priority first, to allow the ISL links with higher priority to remain active.

As a further example, there may exist two trunks between switch 404 and a switch 406: trunk 410 and trunk 412. If the traffic for trunk 412 drops below a minimum threshold, switch 404 may analyze trunk 410 to determine whether ISL trunk 410 can carry the traffic of ISL trunk 412. If so, switch 404 can issue a standby request message to switch 406 to disable a complete trunk (e.g., to disable ISL trunk 412, made up of links 424 and 426).

Activating a Standby ISL Link or Trunk

In some embodiments, switch 402 can activate a standby ISL link 418 when bandwidth across ISL trunk 408 increases above a maximum threshold. For example, if a HSL software module for ISL link 414 or ISL link 416 detects that the link's bandwidth is above the maximum bandwidth threshold, the HSL software module issues an activate request message to switch 402. Switch 402 processes the activate request by determining which other ISL links can be activated to offload some of the bandwidth from the overloaded ISL links. Since ISL link 418 is in standby mode, switch 402 can respond to the activate request by activating ISL link 418, and distributing the traffic for ISL trunk 13 across ISL link 418 in addition to links 414 and 416.

In some embodiments, switch 402 can activate ISL link 418 without requiring switch 120 to send an activation request message to switch 404, and without requiring switch 404 to return an activation acknowledgement message. Recall that switches 402 and 404 can place ISL link 418 in standby mode by each deactivating a transmitter and receiver on a line card for ISL link 418. When switch 402 activates ISL link 418, the line card for ISL link 418 at switch 402 can initiate a physical layer link bring-up routine that activates ISL link 418, without having to wait for switches 402 and 404 to first agree on activating ISL link 418.

Figure 5:
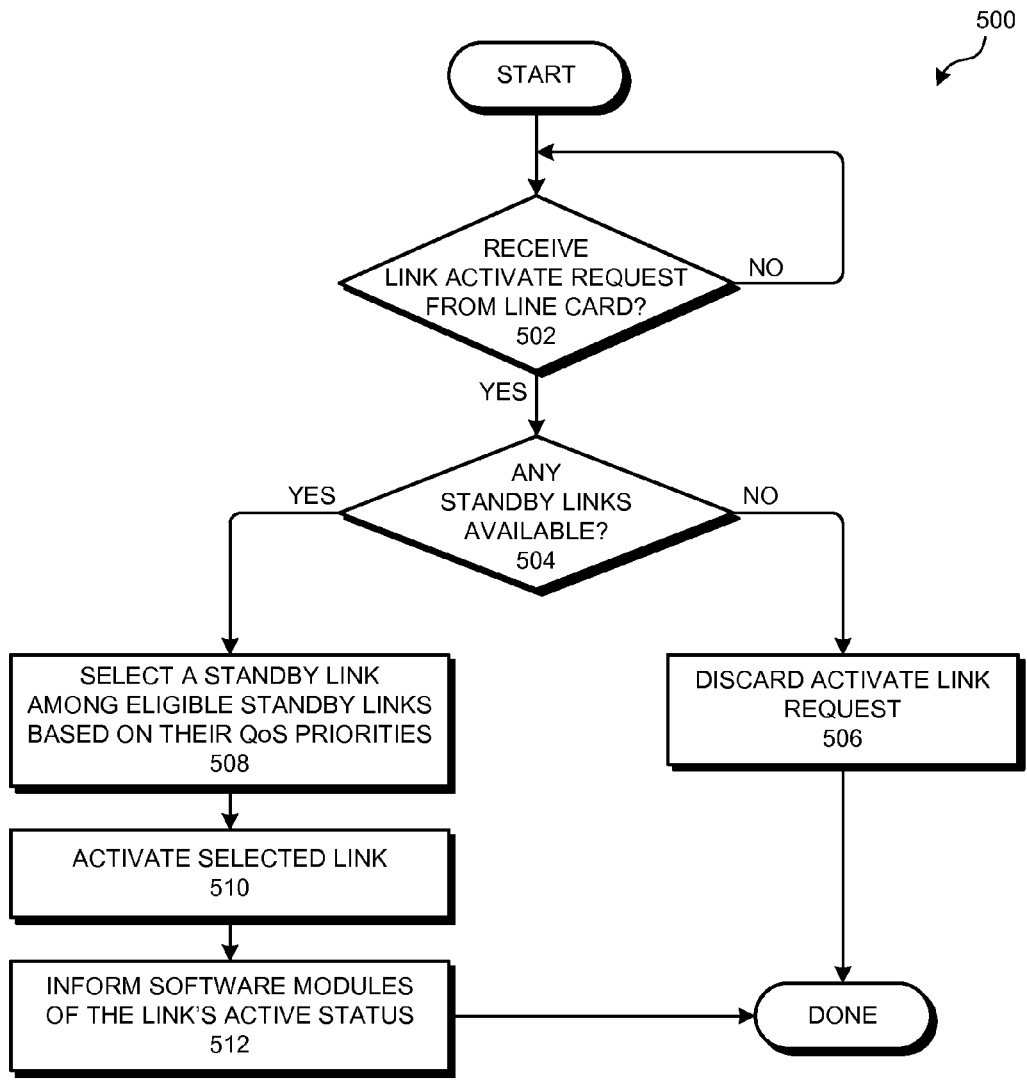
FIG. 5 presents a flow chart illustrating a method for processing a link activate request to activate a link in standby mode in accordance with an embodiment.

FIG. 5 presents a flow chart illustrating a method 500 for processing a link activate request to activate a link in standby mode in accordance with an embodiment. During operation, the switch can determine whether it has received a link activate request from a line card (operation 502). If the switch has not received a link activate request, the switch can return to operation 502 to wait for a link activate request. Once the switch receives a link activate request from a line card, the switch determines whether any standby ISL links exist (operation 504). If no ISL links are currently in standby mode, the switch may discard the activate link request (operation 506), or may perform another remedial action. Some exemplary remedial actions include storing the ignored link activate request in a log file.

However, if at least one ISL link is in standby mode and eligible to be activated, the switch can select a standby link among the eligible standby links, for example, based on their QoS parameters (operation 508). In some embodiments, the switch selects a standby ISL link that has a lowest QoS priority among the set of eligible ISL links in standby. The switch then activates the selected link (operation 510), and can inform one or more software modules of the ISL link's active status (operation 512).

In some embodiments, when the switch activates the standby ISL link, the switch also updates a link state machine that keeps track of the ISL links that are currently available at the local switch.

Also, when the switch activates the ISL link, a local line card that corresponds to this ISL link will perform a physical-layer bring-up routine that communicates with a remote line card at the other side of the ISL link to transition the ISL link from standby mode to active mode. The local switch module does not need to send an activate message to a switch at the other side of the ISL link. Once the ISL link is active, the local switch and the remote switch individually update their trunk state machine (TKSM) to add the new ISL link to a trunk associated with the requesting ISL link.

Figure 6:
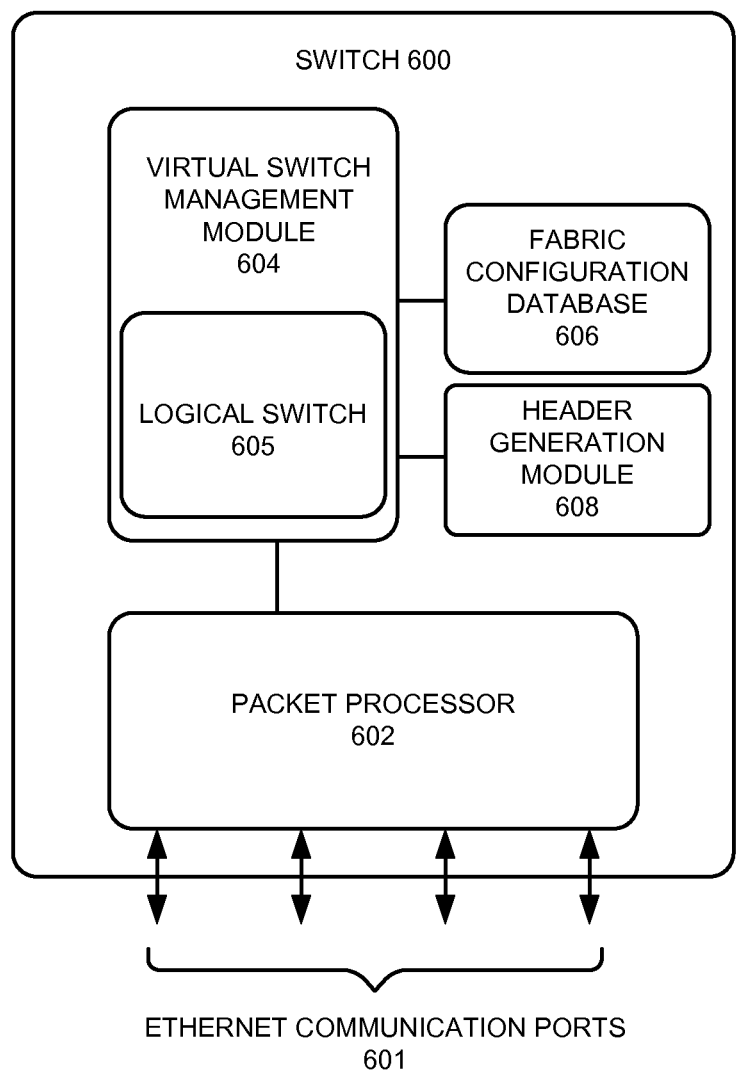
FIG. 6 illustrates an exemplary switch that facilitates managing links in a switch network in accordance with an embodiment.

FIG. 6 illustrates an exemplary member switch of a switching network, in accordance with one embodiment of the present invention. In some embodiments, switch 600 can be running special switch fabric software. Switch 600 includes a number of Ethernet communication ports 601, which can transmit and receive Ethernet frames and/or TRILL encapsulated frames. Also included in switch 600 is a packet processor 602, a virtual switch management module 604, a logical switch 605, a switch fabric configuration database 606, and a header generation module 608.

During operation, packet processor 602 extracts the source and destination MAC addresses of incoming frames, and attaches proper Ethernet or TRILL headers to outgoing frames. Virtual switch management module 604 maintains the state of logical switch 605, which is used to join other fabric switches using the switch fabric protocols. Fabric configuration database 606 maintains the configuration state of every switch within the switch fabric. Header generation module 608 is responsible for generating proper headers for frames that are to be transmitted to other switch fabric member switches. During operation, packet processor 602, virtual switch management module 604, fabric configuration database 606, and header generation module 608 jointly perform the methods described herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A switch, comprising:
one or more line cards; and
power control circuitry configured to:
identify a first standby request from a second switch for placing a first link in a standby mode;
determine whether at least one eligible link can accommodate traffic from the first link;
determine whether a local standby request for the first link is pending;
in response to determining that the at least one eligible link can accommodate traffic from the first link and no local standby request is pending, place a local line card corresponding to the first link in a standby mode; and
defer processing the first standby request in response to determining that the local standby request is pending.

2. The switch of claim 1, wherein the power control circuitry is further configured to reject the first standby request in response to determining that there are insufficient number of eligible links to accommodate traffic from the first link.

3. The switch of claim 2, wherein rejecting the first standby request comprises one of:
generating a negative acknowledgement (NACK) for the first standby request; and
not returning an acknowledgement (ACK) message within a timeout period.

4. The switch of claim 1, wherein the power control circuitry is further configured to:
identify a second standby request from a local line card for placing a second link in a standby mode;
generate, for a neighbor switch corresponding to the second link, a third standby request for placing the second link in standby mode; and
reject the second standby request in response to determining a timeout for the third standby request.

5. The switch of claim 4, wherein the second standby request is based on the second link reaching a low-bandwidth threshold at the local line card.

6. The switch of claim 1, wherein the power control circuitry is further configured to:
determine whether a priority associated with the at least one eligible link is sufficiently high to accommodate traffic from the first link; and
reject the first standby request in response to determining that the priority associated with the at least one eligible link is not sufficiently high.

7. The switch of claim 1, wherein the power control circuitry is further configured to:
determine whether the first link is a member of a trunk; and in response to determining that the first link is a member of the trunk, update trunk state information to remove the first link from the trunk.

8. The switch of claim 1, wherein the power control circuitry is further configured to:
identify a link activation request;
select, from a set of eligible links in standby mode, a link with a lowest priority that satisfies a priority requirement associated with the activation request; and
activate the selected link.

9. The switch of claim 1, wherein the switch is in a network of interconnected switches, and wherein the power control circuitry is further configured to maintain global topology information of the network of interconnected switches.

10. A method, comprising:
identifying, by a switch, a first standby request from a second switch for placing a first link in a standby mode;
determining whether at least one eligible link can accommodate traffic from the first link;
determining whether a local standby request for the first link is pending;
in response to determining that the at least one eligible link can accommodate traffic from the first link and no local standby request is pending, placing a local line card corresponding to the first link in a standby mode; and
defer processing the first standby request in response to determining that the local standby request is pending.

11. The method of claim 10, further comprising rejecting the first standby request in response to determining that there are insufficient number of eligible links to accommodate traffic from the first link.

12. The method of claim 11, wherein rejecting the first standby request comprises one of:
generating a negative acknowledgement (NACK) for the first standby request; and
not returning an acknowledgement (ACK) message within a timeout period.

13. The method of claim 10, further comprising:
identifying a second standby request from a local line card for placing a second link in a standby mode;
generating, for a neighbor switch corresponding to the second link, a second standby request for placing the first link in standby mode; and
rejecting the second standby request in response to determining a timeout for the third standby request.

14. The method of claim 13, wherein the second standby request is based on the second link reaching a low-bandwidth threshold at the local line card.

15. The method of claim 10, further comprising:
determining whether a priority associated with the at least one eligible link is sufficiently high to accommodate traffic from the first link; and
rejecting the first standby request in response to determining that the priority associated with the at least one eligible link is not sufficiently high.

16. The method of claim 10, further comprising:
determining whether the first link is a member of a trunk; and
in response to determining that the first link is a member of the trunk, updating trunk state information to remove the first link from the trunk.

17. The method of claim 10, further comprising:
identifying a link activation request;
selecting, from a set of eligible links in standby mode, a link with a lowest priority that satisfies a priority requirement associated with the link activation request; and
activating the selected link.

18. The method of claim 10, wherein the switch is in a network of interconnected switches; and
wherein the method further comprises maintaining global topology information of the network of interconnected switches.

19. A computer system, comprising:
a processor;
a storage device coupled to the processor and storing instructions which when executed by the processor cause the processor to perform a method, the method comprising:
identifying a first standby request from a second computer system for placing a first link in a standby mode;
determining whether at least one eligible link can accommodate traffic from the first link;
determine whether a local standby request for the first link is pending;
in response to determining that the at least one eligible link can accommodate traffic from the first link and no local standby request is pending, placing a local line card corresponding to the first link in standby mode; and
defer processing the first standby request in response to determining that the local standby request is pending.

20. The computer system of claim 19, wherein the method further comprises rejecting the first standby request in response to determining that there are insufficient number of eligible links to accommodate traffic from the first link.

* * * * *